United States Patent
Namiki et al.

(10) Patent No.: US 10,434,654 B2
(45) Date of Patent: Oct. 8, 2019

(54) CALIBRATION DEVICE, CALIBRATION METHOD, AND COMPUTER READABLE MEDIUM FOR VISUAL SENSOR

(71) Applicant: FANUC CORPORATION, Yamanashi (JP)

(72) Inventors: Yuuta Namiki, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 143 days.

(21) Appl. No.: 15/861,851

(22) Filed: Jan. 4, 2018

(65) Prior Publication Data
US 2018/0194007 A1 Jul. 12, 2018

(30) Foreign Application Priority Data

Jan. 12, 2017 (JP) ................................ 2017-003664

(51) Int. Cl.
*B25J 9/16* (2006.01)
*G06T 7/80* (2017.01)
*B25J 19/04* (2006.01)

(52) U.S. Cl.
CPC ............ *B25J 9/1692* (2013.01); *B25J 9/163* (2013.01); *B25J 9/1697* (2013.01); *B25J 19/04* (2013.01); *G06T 7/85* (2017.01); *G06T 2207/10012* (2013.01); *G06T 2207/30204* (2013.01)

(58) Field of Classification Search
USPC ................................................. 700/245–264
See application file for complete search history.

(56) References Cited

U.S. PATENT DOCUMENTS

| | | | | |
|---|---|---|---|---|
| 5,329,469 A | * | 7/1994 | Watanabe | B25J 9/1697 348/95 |
| 5,951,475 A | * | 9/1999 | Gueziec | G06T 3/0068 128/922 |
| 8,229,208 B2 | * | 7/2012 | Pulla | G01B 21/04 382/154 |
| 8,565,515 B2 | * | 10/2013 | Fujieda | G06K 9/00214 382/113 |
| 9,258,550 B1 | * | 2/2016 | Sieracki | H04N 13/296 |

(Continued)

FOREIGN PATENT DOCUMENTS

| | | |
|---|---|---|
| JP | 2690603 | 8/1997 |
| JP | 2010-172986 | 8/2010 |
| JP | 2015-174191 | 10/2015 |

*Primary Examiner* — Jonathan L Sample
(74) *Attorney, Agent, or Firm* — Wenderoth, Lind, Ponack, L.L.P.

(57) ABSTRACT

A parameter for detecting a target mark 5 is not required to be set for each camera repeatedly while a stereo camera 2 is calibrated. A calibration device 1 associates position information in an image coordinate system at a first camera 21 of a stereo camera 2, position information in an image coordinate system at a second camera 22 of the stereo camera 2, and position information in a robot coordinate system at a robot 4. The calibration device comprises: first parameter setting unit 102 that sets a first parameter for detecting a target mark 5 attached to the robot 4 from data about an image captured by the first camera 21; and a second parameter setting unit 104 that sets a second parameter for detecting the target mark 5 from data about an image captured by the second camera 22 based on the first parameter.

10 Claims, 12 Drawing Sheets

(56) References Cited

U.S. PATENT DOCUMENTS

| | | | | |
|---|---|---|---|---|
| 9,734,419 | B1* | 8/2017 | Ye | G06T 7/00 |
| 2005/0131582 | A1* | 6/2005 | Kazi | B25J 9/1697 |
| | | | | 700/259 |
| 2010/0017178 | A1* | 1/2010 | Tsuk | G01B 11/24 |
| | | | | 703/6 |
| 2010/0092079 | A1* | 4/2010 | Aller | G06K 9/3216 |
| | | | | 382/165 |
| 2010/0234993 | A1* | 9/2010 | Seelinger | B25J 9/1697 |
| | | | | 700/254 |
| 2011/0157353 | A1* | 6/2011 | Takayama | H04N 7/183 |
| | | | | 348/135 |
| 2013/0060146 | A1* | 3/2013 | Yang | A61B 5/055 |
| | | | | 600/476 |
| 2013/0141570 | A1* | 6/2013 | Saruta | G06K 9/78 |
| | | | | 348/135 |
| 2013/0287293 | A1* | 10/2013 | Genc | G06T 15/50 |
| | | | | 382/154 |
| 2014/0067317 | A1* | 3/2014 | Kobayashi | B25J 9/1697 |
| | | | | 702/153 |
| 2014/0376768 | A1* | 12/2014 | Troy | G01S 17/46 |
| | | | | 382/103 |
| 2015/0120055 | A1* | 4/2015 | Miyazawa | B25J 9/1697 |
| | | | | 700/259 |
| 2015/0258688 | A1* | 9/2015 | Suzumura | B25J 9/1692 |
| | | | | 700/254 |
| 2015/0297177 | A1* | 10/2015 | Boctor | A61B 8/4218 |
| | | | | 600/437 |
| 2017/0032537 | A1* | 2/2017 | Li | H04N 17/002 |
| 2017/0172382 | A1* | 6/2017 | Nir | A61B 34/20 |
| 2017/0172675 | A1* | 6/2017 | Jarc | A61B 90/361 |

* cited by examiner

P
(POINT FOR MEASUREMENT
OF THREE-DIMENSIONAL
POSITION)

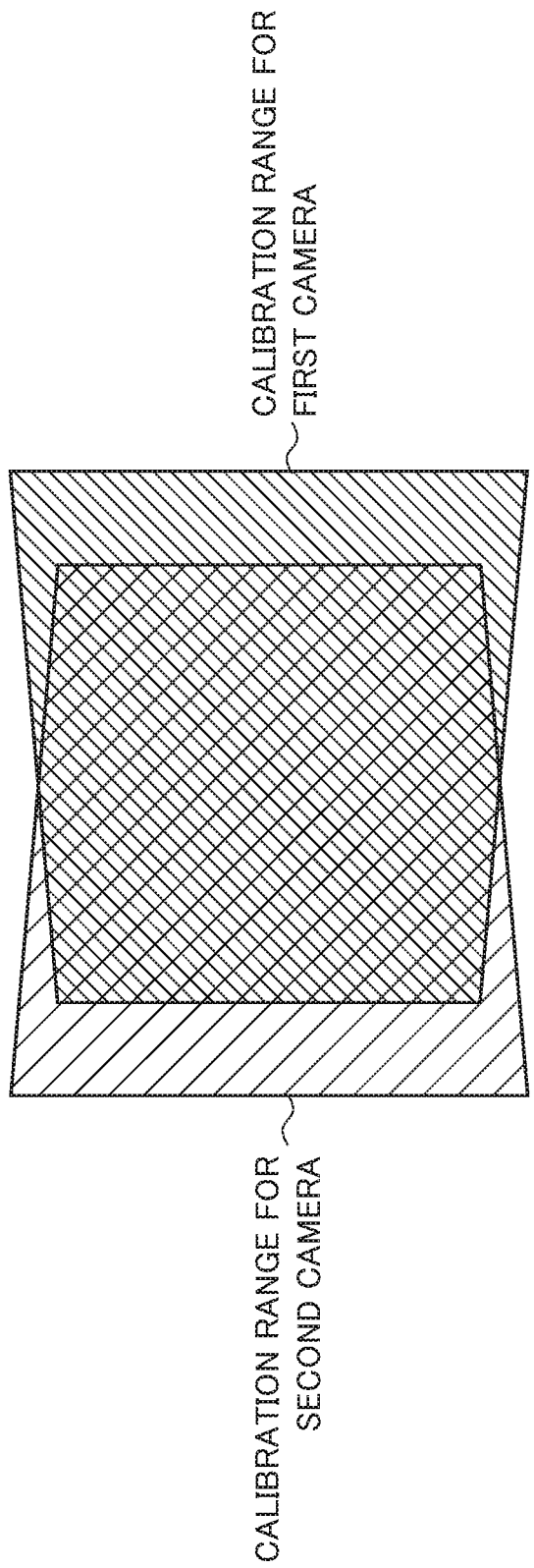

CALIBRATION DEVICE, CALIBRATION METHOD, AND COMPUTER READABLE MEDIUM FOR VISUAL SENSOR

This application is based on and claims the benefit of priority from Japanese Patent Application No. 2017-00664, filed on 12 Jan. 2017, the content of which is incorporated herein by reference.

BACKGROUND OF THE INVENTION

Field of the Invention

The present invention relates to calibration on a visual sensor, particularly, to a calibration device, a calibration method, and computer readable medium encoded with a program for detecting a target mark during implementation of calibration using a stereo camera with multiple cameras.

Related Art

In a robot system, a robot is given a visual function. Operation such as handling or machining on a work is done by making the robot recognize the position of a subject. This visual function is fulfilled by capturing an image of the subject with a visual sensor attached to a hand or a neighboring part of the robot or a visual sensor provided around the robot. In such a robot system, to acquire the position information of the subject viewed from the robot, calibration data is required for converting the position information of the subject in an image to the position information of the subject viewed from the robot.

Calibration data has been acquired by various conventional methods. For example, patent document 1 suggests a method of attaching a lattice pattern to the end of a robot arm and measuring the pattern with a fixedly arranged visual sensor (this method will be called a "method A"). Patent document 2 suggests a method of performing calibration by attaching a target mark having a position and a posture determined in advance in an end point coordinate system at a robot to the end of an arm, and determining the position of the target mark at multiple points in an image of the target mark captured by a visual sensor (this method will be called a "method B").

If calibration is to be performed by the method A, a pattern to be used for the calibration should be prepared in advance. If the view of a camera is too wide or too narrow for the prepared pattern, the method A fails to perform high-precision calibration. In contrast, calibration by the method B allows calibration in a wider view or calibration in a narrower view than in the method A, thereby advantageously increasing the degree of freedom of the calibration. For three-dimensional measurement, a stereo camera has been used in some cases as a visual sensor as described in patent document 3, for example. There have been the following systems for the stereo camera: a passive stereo system of matching corresponding points by using the texture of a subject; and an active stereo system of matching corresponding points by using a pattern projected on a subject. In either case, calibration is required on two or more cameras forming the stereo camera.

Patent Document 1: Japanese Patent No. 2690603
Patent Document 2: Japanese Unexamined Patent Application, Publication No. 2015-174191
Patent Document 3: Japanese Unexamined Patent Application, Publication No. 2010-172986

SUMMARY OF THE INVENTION

For calibration on multi cameras such as those of a stereo camera, each camera is required to be calibrated independently. However, the multiple cameras are attached at separate positions, so that the shapes of a target mark appearing in the cameras are distorted in different ways. If the multiple cameras are attached at different tilts, for example, the shapes of the target mark appearing in the cameras are distorted in different ways.

If the shapes of the target mark appearing in the multiple cameras are distorted in different ways, a model pattern generated by using one camera is often prohibited from being applied to a different camera. Hence, if the shapes of the target mark appearing in the cameras are distorted in different ways, a model pattern should be generated for each of the multiple cameras. Further, to allow detection of the target mark, a parameter for detecting the target mark should be set for each of the multiple cameras such as exposure time, a calibration range in an image, a shape model about the target mark, or a detection parameter, for example. However, generating a model pattern and setting a parameter for detection for each of the multiple cameras during implementation of calibration largely affects the operability of an operator and consumes unnecessary time to decrease efficiency. Hence, in the case of calibration on the multiple cameras, eliminating the need to set a parameter for each of the cameras repeatedly has been required during implementation of calibration.

In this regard, the calibration described in patent document 2 is not to calibrate multiple cameras such as those of a stereo camera but is merely to calibrate a single camera. The calibration described in patent document 3 is performed by attaching a checker board as a basic matrix calculation tool to the end of a robot arm and capturing images of the checker board with a stereo camera. Thus, this calibration does not correspond to calibration performed by attaching a target mark to the end of an arm, and determining the position of the target mark at multiple points in the images of the target mark captured by the stereo camera.

The present invention provides a calibration device, a calibration method, and a program capable of eliminating the need to generate a model pattern and set a parameter for detecting a target mark repeatedly for each of multiple cameras while a stereo camera with these cameras is calibrated.

(1) A calibration device according to the present invention ("visual sensor controller 1" described later, for example) is a calibration device that associates at least one of position information in an image coordinate system at a first camera of a stereo camera and position information in an image coordinate system at a second camera of the stereo camera with position information in a robot coordinate system at a robot. The calibration device comprises: a model pattern generation unit ("model pattern generation unit 101" described later, for example) that generates a model pattern about a target mark attached to the robot; a first parameter setting unit ("first parameter setting unit 102" described later, for example) that uses the model pattern as a basis to set a first parameter for detecting the target mark from data about an image captured by the first camera; a second parameter setting unit ("second parameter setting unit 104" described later, for example) that uses the model pattern as a basis to set a second parameter for detecting the target mark from data about an image captured by the second camera based on the first parameter set by the first parameter setting unit; an image capture control unit ("image capture control unit 100" described later, for example) that makes the first camera and the second camera capture images of the target mark attached to the robot and moved by the robot at each of multiple destinations; a first detection unit ("first detection unit 103" described later, for example) that detects the target mark from the data about the image captured by the first camera, and measures the coordinate position of the detected target mark in the image coordinate system at the first camera by using a value of the first parameter contained in the first parameter; a second detection unit ("second detection unit 105" described later, for example) that detects the target mark from the data about the image captured by the second camera, and measures the coordinate position of the detected target mark in the image coordinate system at the second camera by using a value of the second parameter contained in the second parameter; and a calibration unit ("calibration unit 106" described later, for example) that calibrates the first camera and the second camera based on the coordinate position of the target mark in the image coordinate system at the first camera measured by the first detection unit, the coordinate position of the target mark in the image coordinate system at the second camera measured by the second detection unit, and the coordinate position of the target mark in the robot coordinate system while the images of the target mark are captured by the first camera and the second camera.

(2) In the calibration device described in (1), the target mark may be configured to be attached to an end of an arm of the robot, and have a three-dimensional position and a three-dimensional posture determined in advance in an end point coordinate system at the robot.

(3) In the calibration device described in (1) or (2), each of the first parameter and the second parameter may be configured to include a single numerical value, an on/off value, or a parameter having a range.

(4) In the calibration device described in any one of (1) to (3), the second parameter initially set by the second parameter setting unit may be configured to be set so as to allow detection of the target mark without fail from the image captured by the second camera that is detectable from the data about the image captured by the first camera by using the first parameter set by the first parameter setting unit.

(5) In the calibration device described in (4), if the first parameter has a predetermined range, the second parameter setting unit may be configured to set a range for the second parameter in such a manner that the range for the second parameter has a size determined by a deviation from a center value of the first parameter with respect to a value of the second parameter as a center with which the target mark has been detected successfully from the data about the image captured by the second camera.

(6) In the calibration device described in any one of (1) to (5), each of the first parameter and the second parameter may be configured to include parameters about a model pattern, a size, and deformation about the target mark.

(7) In the calibration device described in any one of (4) to (6), each of the first parameter and the second parameter may be configured as a parameter applied to the model pattern about the target mark. The first detection unit may be configured to detect the target mark from the data about the image captured by the first camera by using the model pattern to which the first parameter is applied. The second detection unit may be configured to detect the target mark from the data about the image captured by the second camera by using the model pattern to which the second parameter is applied.

(8) In the calibration device described in any one of (1) to (6), the first parameter and the second parameter may be configured as parameters applied to the data about the image captured by the first camera and to the data about the image captured by the second camera respectively. The first detection unit may be configured to detect the target mark from image data generated by applying the first parameter to the data about the image captured by the first camera. The second detection unit may be configured to detect the target mark from image data generated by applying the second parameter to the data about the image captured by the second camera.

(9) A calibration method according to the present invention ("visual sensor control method" described later, for example) is a calibration method implemented by a calibration device ("visual sensor controller" described later) that associates position information in an image coordinate system at a first camera of a stereo camera, position information in an image coordinate system at a second camera of the stereo camera, and position information in a robot coordinate system at a robot. The calibration method comprises the following steps executed by the calibration device: a model pattern generation step of generating a model pattern about a target mark attached to the robot; a first parameter setting step of using the model pattern as a basis to set a first parameter for detecting the target mark from data about an image captured by the first camera; a second parameter setting step of using the model pattern as a basis to set a second parameter for detecting the target mark from data about an image captured by the second camera based on the first parameter set by the first parameter setting step; an image capture control step of making the first camera and the second camera capture images of the target mark attached to the robot and moved by the robot at each of multiple destinations; a first detection step of detecting the target mark from the data about the image captured by the first camera, and measuring the coordinate position of the detected target mark in the image coordinate system at the first camera by using a value of the first parameter contained in the first parameter; a second detection step of detecting the target mark from the data about the image captured by the second camera, and measuring the coordinate position of the detected target mark in the image coordinate system at the second camera by using a value of the second parameter contained in the second parameter; and a calibration step of calibrating the first camera and the second camera based on the coordinate position of the target mark in the image coordinate system at the first camera measured by the first detection step, the coordinate position of the target mark in the image coordinate system at the second camera measured by the second detection step, and the coordinate position of the target mark in the robot coordinate system while the images of the target mark are captured by the first camera and the second camera.

(10) A program according to the present invention ("program" described later, for example) causes a computer to execute: a model pattern generation step of generating a model pattern about a target mark attached to a robot; a first parameter setting step of using the model pattern as a basis to set a first parameter for detecting the target mark from data about an image captured by a first camera; a second parameter setting step of using the model pattern as a basis to set a second parameter for detecting the target mark from data about an image captured by a second camera based on the first parameter set by the first parameter setting step; an image capture control step of making the first camera and the second camera capture images of the target mark attached to the robot and moved by the robot at each of multiple destinations; a first detection step of detecting the target mark from the data about the image captured by the first camera, and measuring the coordinate position of the detected target mark in an image coordinate system at the first camera by using a value of the first parameter contained in the first parameter; a second detection step of detecting the target mark from the data about the image captured by the second camera, and measuring the coordinate position of the detected target mark in an image coordinate system at the second camera by using a value of the second parameter contained in the second parameter; and a calibration step of calibrating the first camera and the second camera based on the coordinate position of the target mark in the image coordinate system at the first camera measured by the first detection step, the coordinate position of the target mark in the image coordinate system at the second camera measured by the second detection step, and the coordinate position of the target mark in a robot coordinate system while the images of the target mark are captured by the first camera and the second camera.

A calibration device, a calibration method, and a program provided by the present invention are capable of eliminating the need to generate a model pattern and set a parameter for detecting a target mark repeatedly for each of multiple cameras while a stereo camera with these cameras is calibrated.

BRIEF DESCRIPTION OF THE DRAWINGS

FIG. 6C shows examples of a calibration range;

DETAILED DESCRIPTION OF THE INVENTION

Figure 1:
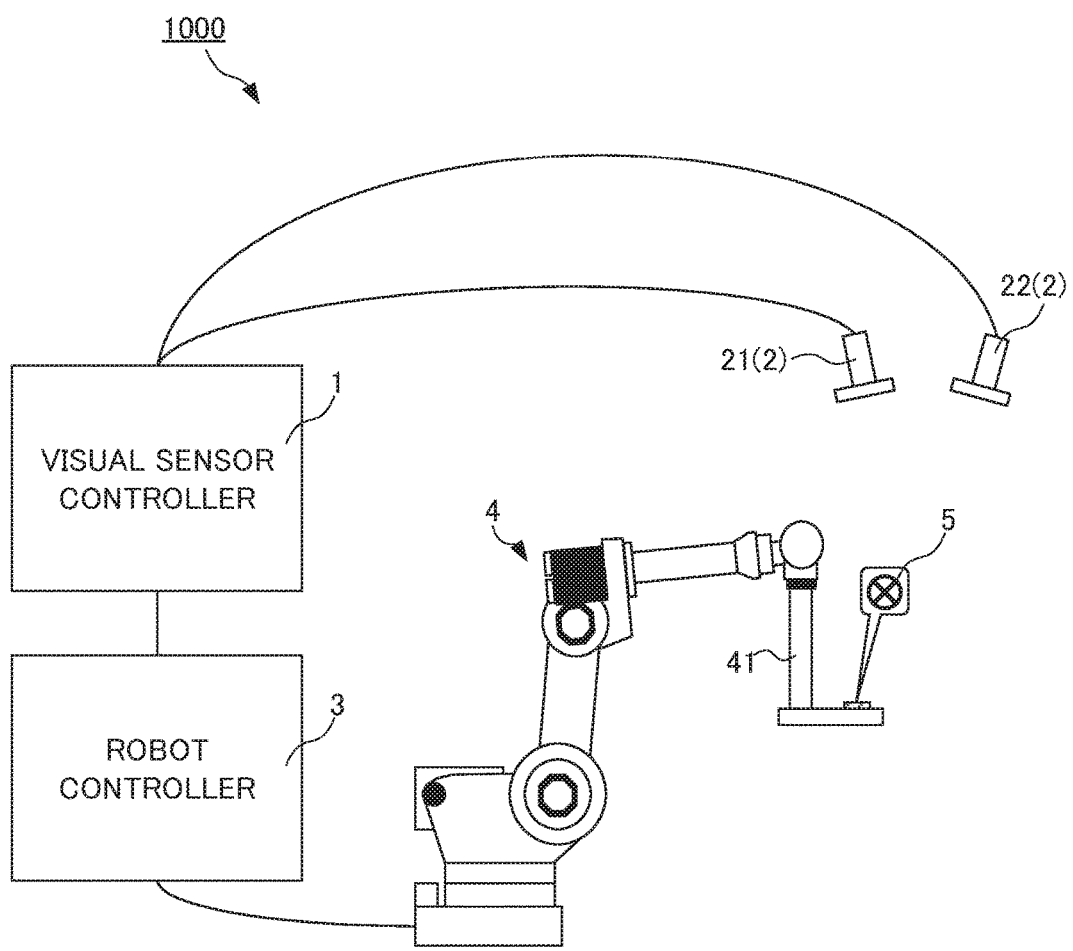
FIG. 1 shows the configuration of a robot system 1000 entirely.

An example of an embodiment of the present invention will be described below. In this embodiment, a visual sensor controller is described as an example of a calibration device. FIG. 1 shows the configuration of a robot system 1000 entire for performing calibration on a visual sensor, particularly calibration by using a stereo camera with multiple cameras. As shown in FIG. 1, the robot system 1000 includes: the stereo camera 2 with two cameras (a first camera 21 and a second camera 22); a visual sensor controller 1 (as a calibration device) that makes three-dimensional measurement through image processing on data about an image captured by the stereo camera 2; a robot 4 having an arm 41 with an end portion to which a target mark 5 is attached; and a robot controller 3 for control over the robot 4. The number of cameras forming the stereo camera 2 is not limited to two but can be any number of two or more. Each of the cameras forming the stereo camera 2 is certainly applicable as a single camera.

Figure 2A:
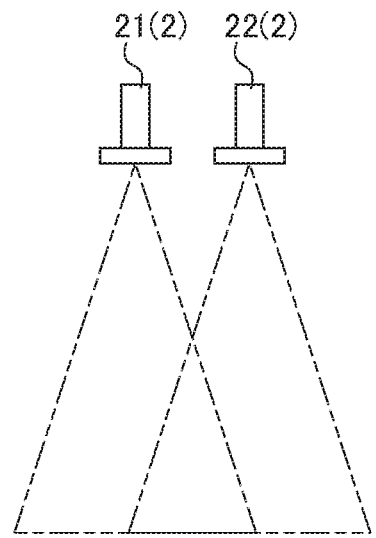
FIG. 2A shows an example of arrangement of a stereo camera 2.
Figure 2B:
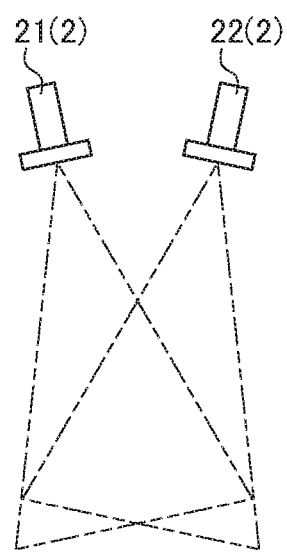
FIG. 2B shows an example of arrangement of the stereo camera 2.

FIGS. 2A and 2B each show an example of arrangement of the stereo camera 2. The stereo camera 2 is fixed to a pedestal (not shown in the drawings). As shown in FIG. 2A, the first camera 21 and the second camera 22 may be arranged parallel to each other. As shown in FIG. 2B, each of the first camera 21 and the second camera 22 may be arranged at a tilt. Tilting each of the first camera 21 and the second camera 22 makes it possible to increase an area of an overlap between an area of image capture by the first camera 21 and an area of image capture by the second camera 22, compared to arranging the first camera 21 and the second camera 22 parallel to each other. Specifically, tilting each of the first camera 21 and the second camera 22 makes it possible to increase an area where three-dimensional measurement is allowed by the stereo camera 2, compared to arranging the first camera 21 and the second camera 22 parallel to each other. However, tilting each of the first camera 21 and the second camera 22 increases a difference between distortion of a subject (target mark 5) in an image captured by the first camera 21 and distortion of the subject (target mark 5) in an image captured by the second camera 22, compared to arranging the first camera 21 and the second camera 22 parallel to each other. The first camera 21 and the second camera 22 desirably have the same configuration in terms of a view range, a lens, etc. By doing so, the first camera 21 and the second camera 22 are expected to catch the target mark 5 in the same way.

Figure 3:
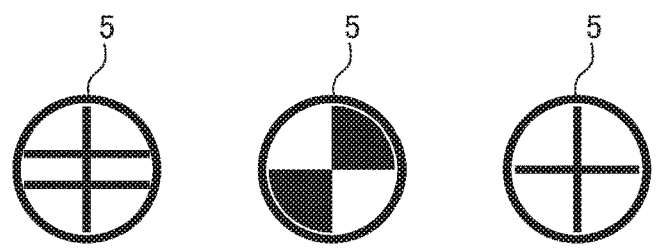
FIG. 3 shows examples of a target mark 5.
Figure 4:
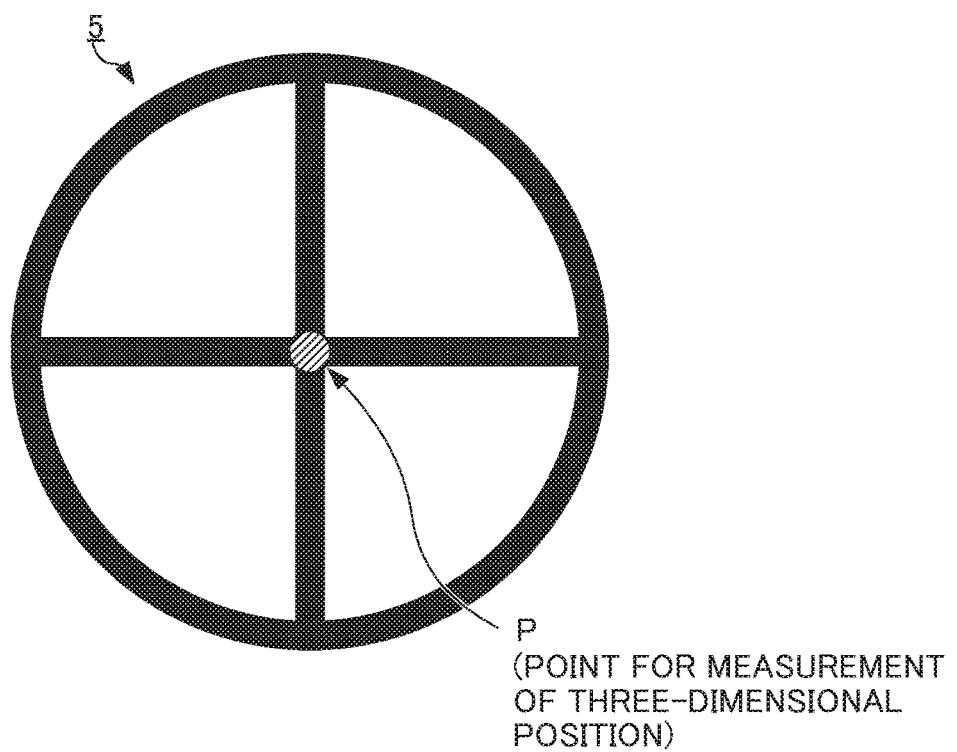
FIG. 4 shows an example of a point P where the three-dimensional position of the target mark 5 is to be measured.

FIG. 3 shows examples of the target mark 5. The target mark 5 is not limited to these examples. Any shape is applicable to the target mark 5. Meanwhile, the shape of the target mark 5 is desirably such that the characteristics of the target mark 5 used as a model pattern are expressed on a two-dimensional plane. The target mark 5 may be a mark printed on paper or a seal and attached to the end of the arm 41 of the robot 4, for example. The target mark 5 attached to the end portion of the arm 41 has a point designated in advance where the three-dimensional position of the target mark 5 is to be measured. The target mark 5 also has a three-dimensional position and a three-dimensional posture determined in advance in an end point coordinate system at the robot 4. FIG. 4 shows an example of a point P where the three-dimensional position of the target mark 5 is to be measured. If the point P where the three-dimensional position of the target mark 5 is to be measured shown in FIG. 4 is not designated explicitly, the target mark 5 may be measured at a center point.

Figure 5A:
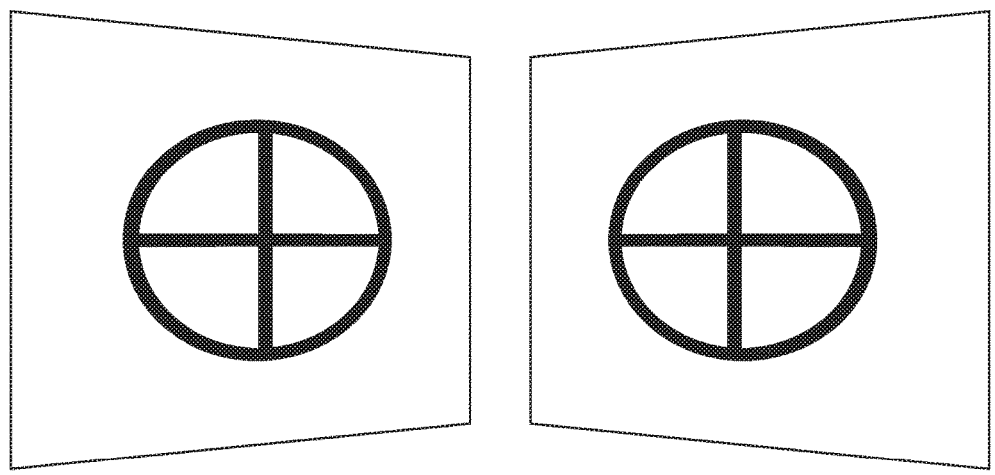
FIG. 5A shows examples of distortions of a subject in images of the subject captured by multiple cameras.
Figure 5B:
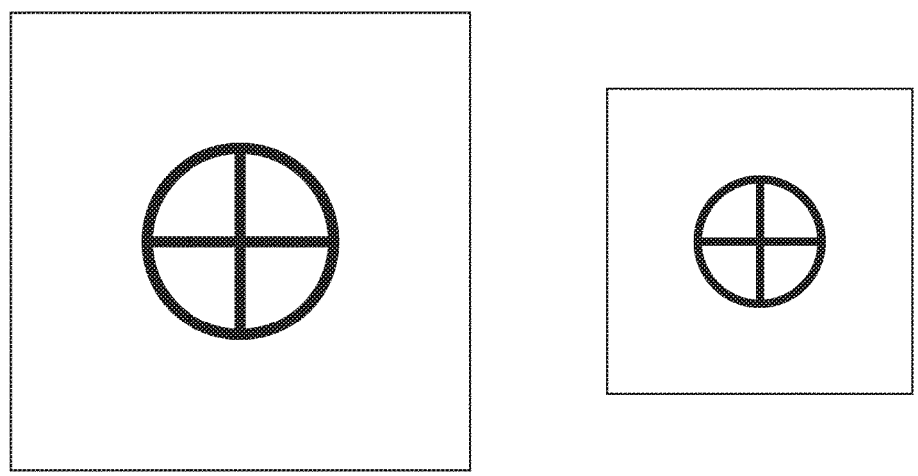
FIG. 5B shows examples of distortions of the subject in images of the subject captured by multiple cameras.

FIGS. 5A and 5B each show examples of distortions of a subject in images of the subject captured by multiple cameras. FIG. 5A shows examples where the captured images of the subject are distorted in opposite directions. FIG. 5B shows examples where the captured images of the subject have different sizes so the target mark 5 appears in the images in different sizes.

The robot controller 3 recognizes the coordinate position of the end of the arm 41 in a robot coordinate system as a current position. Thus, based on the coordinate position of the end of the arm 41 in the robot coordinate system and the known three-dimensional position information and the known three-dimensional posture information of the target mark 5 in the end point coordinate system at the robot 4, the robot controller 3 can always recognize the coordinate position of the target mark 5 in the robot coordinate system while the robot controller 3 controls drive of the arm 41. The robot controller 3 includes a CPU (not shown in the drawings) for controlling the robot controller 3 entirely in an integrated fashion. The visual sensor controller 1 is connected to the robot controller 3 through an external equipment interface (not shown in the drawings). The robot controller 3 transmits the coordinate position of the target mark 5 in the robot coordinate system to the visual sensor controller 1. Further, the robot controller 3 receives a result of image processing obtained by execution of the image processing (detection of the target mark 5, for example) by the visual sensor controller 1, etc.

Figure 6A:
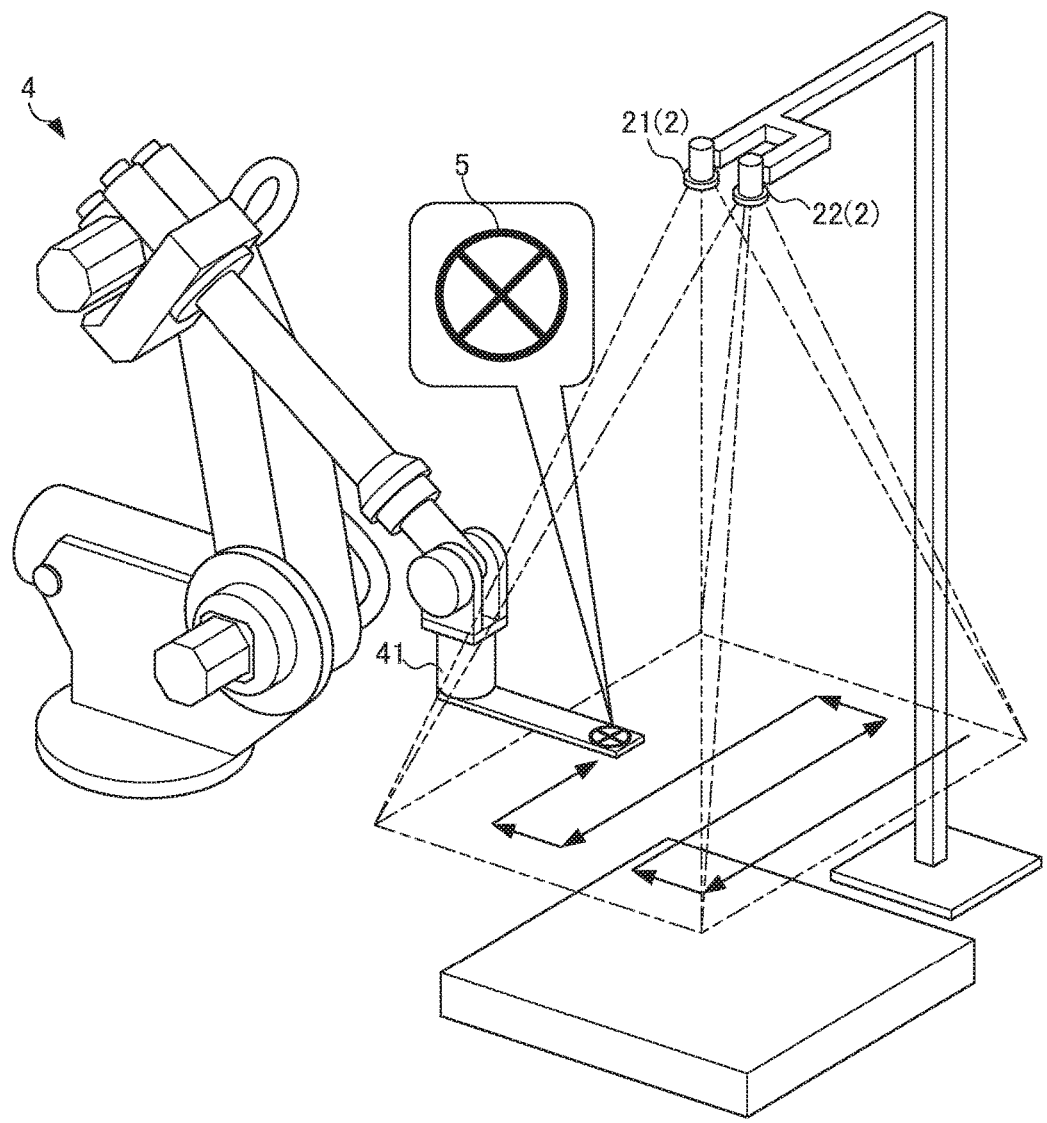
FIG. 6A. shows an example of a path traced by the target mark 5 attached to an end portion of an arm while the target mark 5 is moved in a calibration range.
Figure 6B:
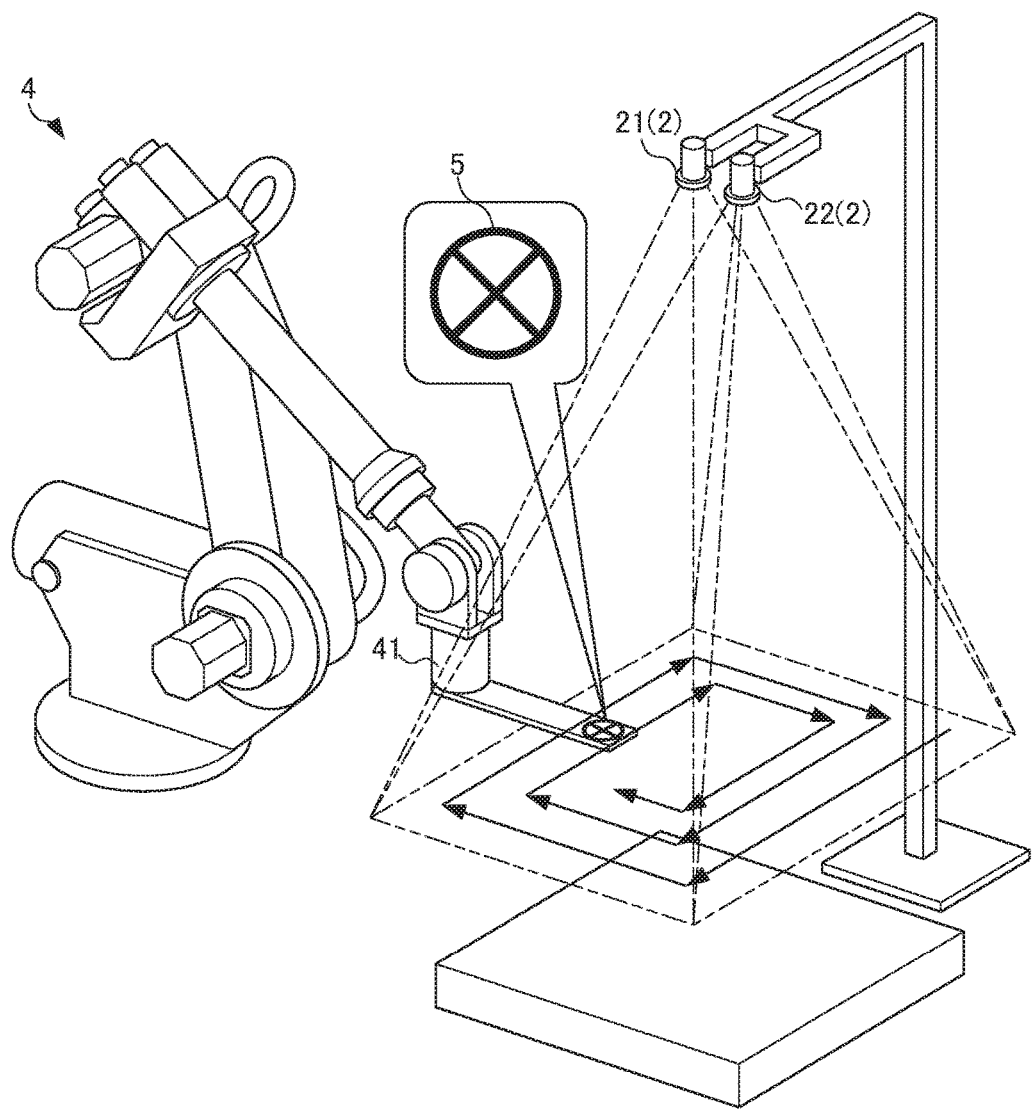
FIG. 6B shows an example of a path traced by the target mark 5 attached to the end portion of the arm while the target mark 5 is moved in a calibration range.

The robot controller 3 controls drive of the arm 41 so as to move the target mark 5 attached to the end of the arm 41 in a range set in advance for calibration (called a "calibration range") during implementation of the calibration. At this time, the arm 41 desirably moves through the set calibration range uniformly. For example, the robot 4 may be controlled in such a manner that the target mark 5 moves by tracing a path shown in FIG. 6A or 6B.

The calibration range mentioned herein means space where the target mark 5 attached to the end portion of the arm 41 is to be moved during implementation of calibration, which is a range of move of the target mark 5 for allowing image capture of the target mark 5 in a range (angle of view) of image capture by at least one of the first camera 21 and the second camera 22 after the target mark 5 is moved. FIG. 6C shows an example of the calibration range. The calibration range can be designated as a rectangle on a plane in this space, for example. If the calibration range is designated as a rectangle, the coordinate positions of the four corners of the rectangle may be measured in the robot coordinate system. If the space for move of the target mark 5 attached to the end portion of the arm 41 includes an obstacle, for example, the calibration range may be designated as a closed graphic drawn with multiple line segments so as to avoid the obstacle.

The robot controller 3 measures the coordinate position of the target mark 5 in the robot coordinate system attached to the end of the arm 41 of the robot 4. Specifically, the robot controller 3 can measure the coordinate position of the target mark 5 in the robot coordinate system while the target mark 5 is at a destination.

The stereo camera 2 with the first camera 21 and the second camera 22 is connected to the visual sensor controller 1. The visual sensor controller 1 makes the first camera 21 and the second camera 22 capture images of the target mark 5, and calibrates the first camera 21 and the second camera 22. In this way, the visual sensor controller 1 of this embodiment fulfills a function as a calibration device.

Figure 7:
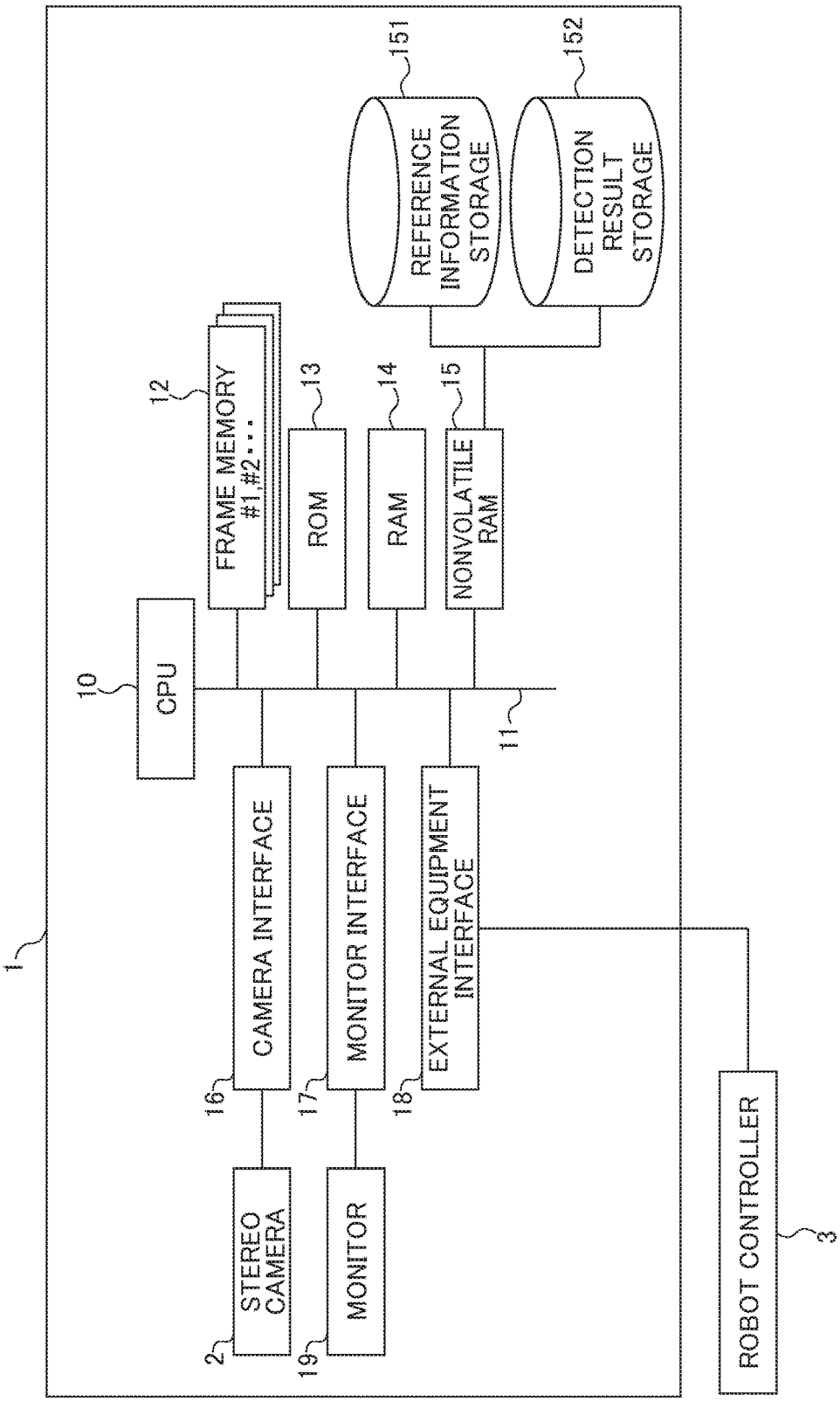
FIG. 7 is a functional block diagram showing the functional configuration of a visual sensor controller 1.

FIG. 7 is a functional block diagram showing the functional configuration of the visual sensor controller 1. As shown in FIG. 7, the visual sensor controller 1 includes a central processing unit (CPU) 10 for controlling the visual sensor controller 1 entirely in an integrated fashion. The CPU 10 is connected through a bus 11 to multiple frame memories 12, a read-only memory (ROM) 13, a random access memory (PAM) 14, and a nonvolatile RAM 15. The stereo camera 2 (first camera 21 and second camera 22) is connected to the bus 11 through a camera interface 16. Further, a monitor 19 is connected to the bus 11 through a monitor interface 17. The CPU 10 is further connected through the bus 11 to an external equipment interface 18.

The ROM 13 stores programs used for execution of various types of process by the visual sensor controller 1. Generally, access is made faster to a RAM than to a ROM. Thus, the CPU 10 may develop the programs stored in the ROM 13 in advance on the RAM 14. Then, the CPU 10 may read the programs from the RAM 14 and execute the read programs. The RAM 14 stores temporarily saved data necessary for execution of the programs.

The nonvolatile RAM 15 is a magnetic storage unit, a flash memory, an MRAM, FRAM (registered trademark), or an EEPROM, for example. Alternatively, the nonvolatile RAM 15 is an SRAM or a DRAM backed up by a battery, for example. The nonvolatile RAM 15 is configured as a nonvolatile memory to hold its storage state even after the visual sensor controller 1 is powered off. The nonvolatile RAM 15 stores setting necessary for execution of the programs, for example. The frame memory 12 stores image data.

[Model Pattern]

The nonvolatile RAM 15 includes a reference information storage 151 and a detection result storage 152. The reference information storage 151 stores reference information (also called a "model pattern" or a "template") indicating a subject (target mark 5). The reference information may be a group of edge points (also called an "edge point group") in a subject (target mark 5), for example. The edge point is a point where brightness changes largely in an image. For example, the edge point group may be formed by converting the subject (target mark 5) to an edge image through publicly-known Sobel filtering, and extracting a pixel (edge point) having an intensity of a predetermined threshold or more from the edge image. The edge point group extracted in this way from the image including the subject (target mark 5) to be detected is stored as the model pattern into the reference information storage 151. The model pattern is not limited to edge points. For example, feature points such as those extracted by publicly-known SIFT may be used as the model pattern. Alternatively, the model pattern may be generated by arranging a geometric graphic such as a line segment, a rectangle, or a circle so as to match the contour of the subject (target mark 5). In this case, feature points may be provided at proper intervals on the geometric graphic forming the contour. The model pattern may also be a template image generated by cutting out a part corresponding to a model pattern designation area from a captured image of the target mark 5. As described above, the target mark 5 attached to the end of the arm 41 has the point P designated in advance where the three-dimensional position of the target mark 5 is to be measured. The target mark 5 also has a three-dimensional position and a three-dimensional posture determined in advance in the end point coordinate system at the robot 4. Storing the model pattern in advance generated in the above described way into the reference information storage 151 is also called "teaching the model pattern." Teaching of the model pattern will be described later.

The detection result storage 152 stores a result of detection of the target mark 5 detected by using the taught model pattern from data about an image captured by each of the first camera 21 and the second camera 22 while the target mark 5 having been moved in the set calibration range is at each destination.

In response to a command from the CPU 10, each of the first camera 21 and the second camera 22 captures an image of the subject to acquire the image, and outputs a signal about the acquired image. The camera interface 16 has the function of generating a synchronization signal for controlling timing of exposure for the first camera 21 and the second camera 22 in response to a command from the CPU 10, and the function of amplifying a signal received from each of the first camera 21 and the second camera 22. The first camera 21, the second camera 22, and the camera interface 16 are not limited to any particular parts but are commercially-available and common-used parts.

The signal about the image taken from each of the first camera 21 and the second camera 22 is A/D converted by the camera interface 16, and then stored temporarily as digital image data through the bus 11 into the frame memory 12. In the visual sensor controller 1, the CPU 10 processes the image by using data stored in the frame memory 12, the ROM 13, the RAM 14, and the nonvolatile RAM 15. Data resulting from the image processing is stored again into the frame memory 12. In response to a command, the CPU 10 may transfer the data stored in the frame memory 12 to the monitor interface 17 and display the data on the monitor 19 in order to allow check of the substance of the data by an operator, for example.

The external equipment interface 18 is connected to various types of external equipment. For example, the external equipment interface 18 is connected to the robot controller 3 to receive the coordinate position of the target mark 5 in the robot coordinate system from the robot controller 3 and supply the robot controller 3 with position information data obtained by image processing, etc. A keyboard or a mouse may also be connected to the external equipment interface 18 as an input unit 33 for an operator, for example.

Figure 8:
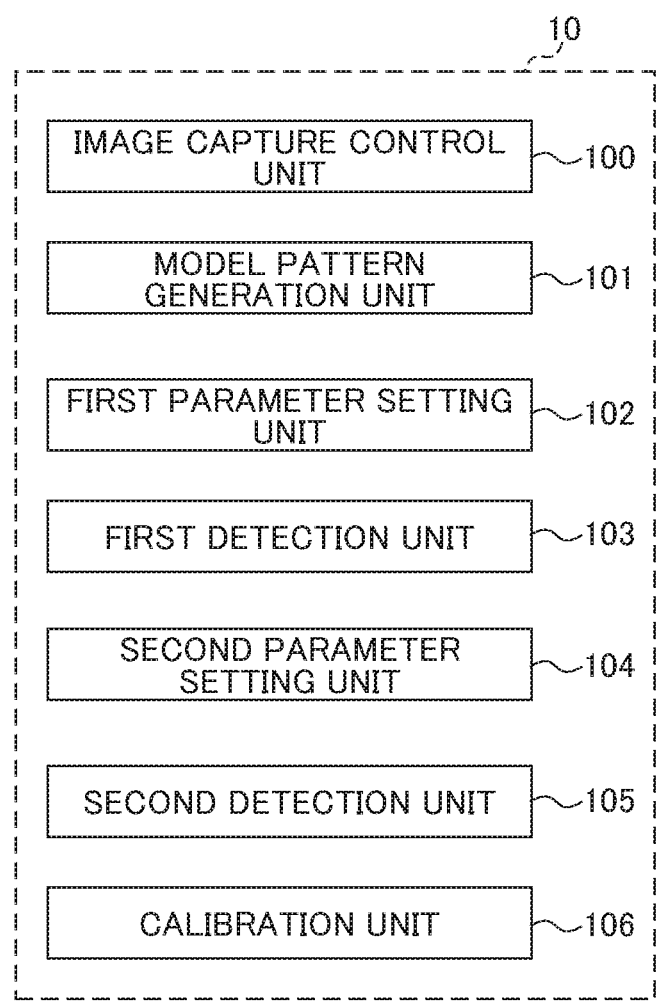
FIG. 8 is a block diagram showing the functional configuration of a CPU 10 in the visual sensor controller 1.

The function of the CPU 10 will be described next in terms of each processing unit. Description in terms of each processing step (method) will be omitted as each processing step (method) can be understood by replacing "unit" in the following description by "step." FIG. 8 is a block diagram showing the functional configuration of the CPU 10 in the visual sensor controller 1. The CPU 10 includes an image capture control unit 100, a model pattern generation unit 101, a first parameter setting unit 102, a first detection unit 103, a second parameter setting unit 104, a second detection unit 105, and a calibration unit 106. Each of these functional units is realized by execution of a system program in the ROM 13 by the CPU 10.

[Image Capture Control Unit 100]

The image capture control unit 100 makes each of the first camera and the second camera capture an image of the target mark 5 attached to the end of the arm 41 of the robot 4 and to be moved by the robot 4 in a calibration range. In particular, during implementation of calibration, images of the target mark 5 are captured at multiple destination positions. The number of the destinations is desirably set to be larger than a number minimum for allowing calibration (a desired number is 20 or more, for example). By doing so, calibration can be performed more precisely.

[Model Pattern Generation Unit 101]

Figure 9:
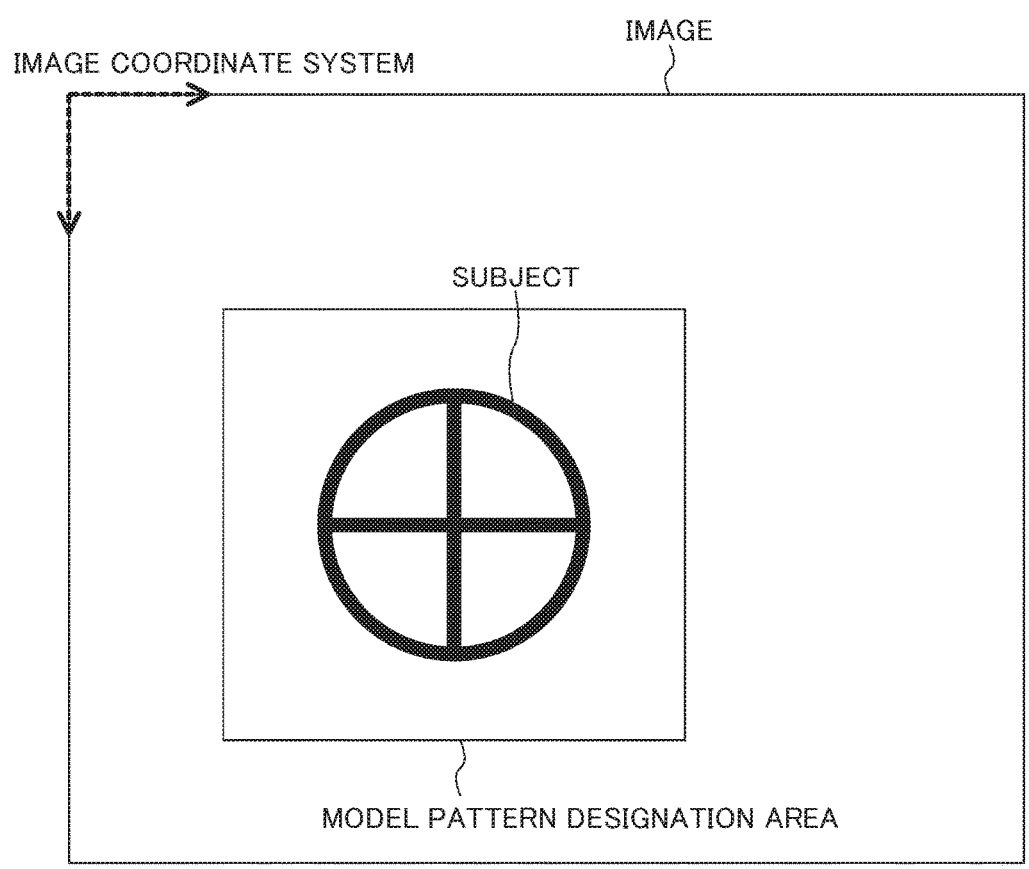
FIG. 9 shows an example of a model pattern.
Figure 10:
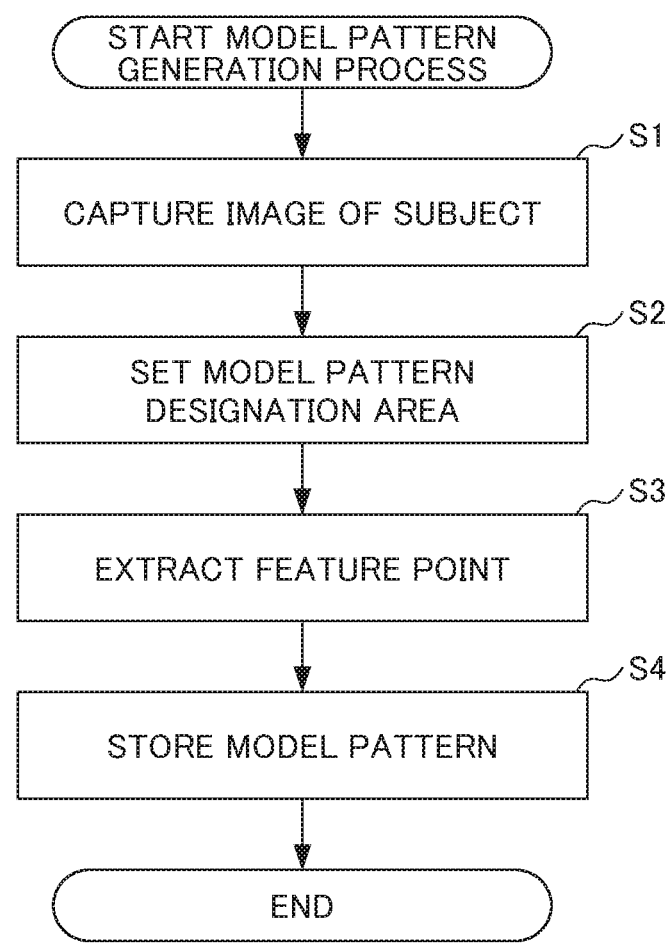
FIG. 10 shows a flowchart for generating the model pattern.

The model pattern generation unit 101 generates a model pattern by using the first camera 21, for example. FIG. 9 shows an example of the model pattern. FIG. 10 shows a flowchart for generating the model pattern. The model pattern generation unit 101 generates a model pattern such as the one shown in FIG. 9. The function of the model pattern generation unit 101 will be described by referring to FIG. 10.

In step S1, the model pattern generation unit 101 exerts control to make the first camera 21 capture an image of the target mark 5 arranged in the view of the first camera 21. At this time, a relationship between the position of the first camera 21 and that of the target mark 5 is desirably set to be the same as that during detection of the target mark 5.

In step S2, the model pattern generation unit 101 sets an area in the captured image of the target mark 5 in the form of a rectangular area or a circular area, for example, as a model pattern designation area in which the target mark 5 appears. Further, the model pattern generation unit 101 defines a model pattern coordinate system in the model pattern designation area. The model pattern generation unit 101 may set an area instructed by an operator as the model pattern designation area. Alternatively, the model pattern generation unit 101 may determine spots of large brightness gradients in the image as the contour of the image of the target mark 5, and set the model pattern designation area so as to contain the contour of the image of the target mark 5 inside the model pattern designation area.

In step S3, the model pattern generation unit 101 extracts an edge point in the model pattern designation area as a feature point, obtains physical quantities such as the position information of the edge point, the direction and the magnitude of a brightness gradient at the edge point, etc., and converts the edge point to a value expressed in the model pattern coordinate system defined in the model pattern designation area. Further, the model pattern generation unit 101 sets a point instructed by the operator as the point P where the three-dimensional position of the target mark 5 is to be measured, and stores the point P into the reference information storage 151. For example, the model pattern generation unit 101 may set a center point of a model pattern as the point P where the three-dimensional position of the target mark 5 is to be measured. As described above, the model pattern is not limited to edge points. For example, feature points such as those extracted by publicly-known SIFT may be used as the model pattern. Alternatively, the model pattern may be generated by arranging a geometric graphic such as a line segment, a rectangle, or a circle so as to match the contour of a subject (target mark 5). In this case, feature points may be provided at proper intervals on the geometric graphic forming the contour. The model pattern may also be a template image generated by cutting out a part corresponding to the model pattern designation area from the captured image of the target mark 5.

In step S4, the model pattern generation unit 101 stores the generated model pattern into the reference information storage 151. As described above, the model pattern is generated by using the image captured by one of the cameras (first camera 21). The model pattern generated by using the image captured by the first camera 21 is also used as a model pattern for the second camera 22.

The following describes a problem occurring in detecting the target mark 5 from data about the image captured by the first camera 21 by using the model pattern stored in the reference information storage 151.

During implementation of calibration, it is probable that images of the target mark 5 will be captured by the first camera 21 in different environments. Such different environments may be caused by different destination positions, for example, which changes a relationship between the position of the first camera 21 and that of the target mark 5. Hence, an image of the target mark 5 attached to the end portion of the arm 41 captured by the first camera 21 may differ in a manner that depends on a destination of the target mark 5 in the calibration range from the model pattern generated by the model pattern generation unit 101 in terms of appearance such as a size, brightness, or the occurrence of rotation or distortion. As a result, it is likely that, in trying to detect the target mark 5 completely matching the model pattern, it will be impossible to detect such a subject (target mark 5) from data about the image captured by the first camera 21.

[First Parameter Setting Unit 102]

The first parameter setting unit 102 sets a first parameter for detecting a model pattern about the target mark 5 from data about an image captured by the first camera 21 so as to allow detection of the model pattern at any destination of the target mark 5 in the calibration range even in the above-described situation. More specifically, the first parameter set by the first parameter setting unit 102 depends on a detection algorithm. For example, the first parameter may be set to have a predetermined range with respect to a model in terms of a size, rotation, distortion, a position range or an angle range for detection, for example. Alternatively, the first parameter may be set as a single numerical value or an on/off value. The first parameter is not limited to these examples. Thus, the first detection unit 103 described later is configured to be capable of detecting the target mark 5 matching the model pattern from captured image data by using a single numerical value, an on/off value, or a parameter value in a predetermined range so as to allow detection of the model pattern at any destination of the target mark 5. By doing so, the model pattern can be detected from the captured image data by using a proper parameter value. The first parameter may be a parameter to be applied to data about an image captured by the first camera 21. In this case, the first detection unit 103 is configured to detect the model pattern about the target mark 5 from image data generated by applying the first parameter to the data about the image captured by the first camera 21. For example, the model pattern can be detected from image data generated by smoothing the image data by a Gaussian filter. The first parameter may be a parameter to be applied to the model pattern about the target mark 5. In this case, the first detection unit 103 is configured to detect the target mark 5 from the data about the image captured by the first camera 21 by using the model pattern to which the first parameter is applied.

One example of the first parameter set by the first parameter setting unit 102 and applied to the model pattern may be a transformation matrix for projection transformation, affine transformation, or homothetic transformation. For example, if a value of the first parameter is set as a single numerical value, a single transformation matrix is selectable. If a value of the first parameter is set to have a predetermined range, a transformation matrix of a predetermined range is selectable. The following describes specific examples applied if the first parameter is set to have a predetermined range. In the case of a projection transformation matrix, the first parameter may be set in such a manner that a parameter range covers a projection transformation matrix with an element having a deviation of a predetermined threshold or less from a corresponding element in a projection transformation matrix as a basis. In the case of rotation, a range for a rotation angle may be set based on one rotation angle. Likewise, in the case of homothetic transformation, a range for a homothetic ratio may be set based on one homothetic ratio. By doing so, robust detection can be realized on the occurrence of a difference in appearance of the target mark 5 resulting from different destinations of the target mark 5, for example. A parameter value for exposure time is desirably set in consideration of an angle between the first camera 21 and a plane on which the target mark 5 is arranged or a relationship with illumination, for example.

[First Detection Unit 103]

The first detection unit 103 detects the target mark 5 from the data about the image captured by the first camera 21, and measures the coordinate position of the detected target mark 5 in an image coordinate system at the first camera 21. More specifically, the first detection unit 103 selects a parameter from a single numerical value, an on/off value, or a predetermined range for the first parameter. In selecting the parameter from the predetermined range, a center value in the parameter range may be selected first, for example. Then, a value shifted in the plus or minus direction from the center value may be selected as a next parameter, for example.

If the first parameter is a parameter to be applied to the data about the image captured by the first camera 21 as described above, after the first detection unit 103 selects the parameter from a single numerical value, an on/off value, or a predetermined range for the parameter, the first detection unit 103 converts the data about the image captured by the first camera 21 by using the selected parameter so as to allow detection of the target mark 5 from the image data. In this way, the first detection unit 103 is allowed to detect the target mark 5 from the converted image data by the publicly-known detection technique.

More specifically, the first detection unit 103 extracts a feature point from the image data to which the first parameter is applied by the same method as applied for extracting a feature point from the taught model pattern, and conducts publicly-known matching between the extracted feature point and a feature point forming the model pattern, thereby detecting the target mark 5.

Conversely, the first detection unit 103 may convert the model pattern about the target mark 5 by using the selected parameter. In this case, the first detection unit 103 can detect the target mark 5 matching the converted model pattern from the captured image data by the above-described publicly-known detection technique. More specifically, the first detection unit 103 extracts a feature point from the data about the image captured by the first camera 21 by the same method as applied for extracting a feature point from the taught model pattern, and conducts publicly-known matching between the extracted feature point and a feature point in the model pattern to which the parameter is applied, thereby detecting the target mark 5. The first detection unit 103 measures the coordinate position of the detected target mark 5 in the image coordinate system at the first camera 21.

[Second Parameter Setting Unit 104]

The following description is for the second parameter setting unit 104 that uses the model pattern about the target mark 5 generated by using the first camera 21 to set a second parameter for detecting this model pattern from data about an image captured by the second camera 22. The second parameter setting unit 104 sets the second parameter for detecting the model pattern about the target mark 5 from the data about the image captured by the second camera 22 based on the first parameter set by the first parameter setting unit 102. More specifically, the second parameter setting unit 104 uses the first parameter as it is for initially setting a value of the second parameter. Meanwhile, if a value of the second parameter is set to have a predetermined range during initial setting of the second parameter, for example, the second parameter setting unit 104 may employ the same range as the first parameter. Alternatively, the second parameter setting unit 104 may set a wide range for the second parameter covering the predetermined range for the first parameter set by the first parameter setting unit 102. In such cases, if the second detection unit 105 described later has detected the model pattern about the target mark 5 successfully from the data about the image captured by the second camera 22 by applying a given value of the second parameter, the second parameter setting unit 104 can set a range for a value of the second parameter again with respect to this value of the second parameter as a center based on a deviation from a center value in the predetermined range for the first parameter. For example, if the first parameter set for the first camera 21 has a size range from 0.9 to 1.1, a center value is 1.0 and a deviation from the center value in the predetermined range for the first parameter is 0.1. If a subject (target mark 5) of the second camera 22 has been detected first successfully by setting a size of the second parameter for the second camera 22 at 0.95, a center value of the second parameter is set at 0.95 and the deviation in the first parameter is applied to the second parameter. Specifically, a value of the second parameter is set in a range [0.85 to 1.05] with respect to 0.95 as a center value. In this way, the range for a value of the second parameter during initial setting of the second parameter can be readjusted, so that the model pattern can be detected more efficiently from the data about the image captured by the second camera 22.

[Second Detection Unit 105]

The second detection unit 105 detects the model pattern about the target mark 5 from the data about the image captured by the second camera 22, and measures the coordinate position of the detected target mark 5 in an image coordinate system at the second camera 22. Detection process by the second detection unit 105 can be understood by replacing the first camera 21, the first parameter setting unit 102, and the first parameter in the description for the detection process given above by the second camera 22, the second parameter setting unit 104, and the second parameter respectively. Thus, the detection process by the second detection unit 105 will not be described.

[Calibration Unit 106]

The calibration unit 106 stores the following coordinate positions into the detection result storage 152 at each of multiple destinations of the target mark 5 attached to the end of the arm 41 of the robot 4 and moved by the robot controller 3: the coordinate position of the target mark 5 in the image coordinate system at the first camera 21 appearing in the data about the image captured by the first camera 21; the coordinate position of the target mark 5 in the image coordinate system at the second camera 22 appearing in the data about the image captured by the second camera 22; and the coordinate position of the target mark 5 in the robot coordinate system while the image of the target mark 5 is captured by the first camera 21 or the second camera 22. The calibration unit 106 calibrates the first camera 21 and the second camera 22 based on the coordinate position of the target mark 5 in the image coordinate system at the first camera 21 stored in the detection result storage 152, the coordinate position of the target mark 5 in the image coordinate system at the second camera 22 stored in the detection result storage 152, and the coordinate position of the target mark 5 in the robot coordinate system while the images of the target mark 5 are captured by the first camera 21 and the second camera 22 stored in the detection result storage 152. The first camera 21 and the second camera 22 can certainly be calibrated individually.

Figure 11:
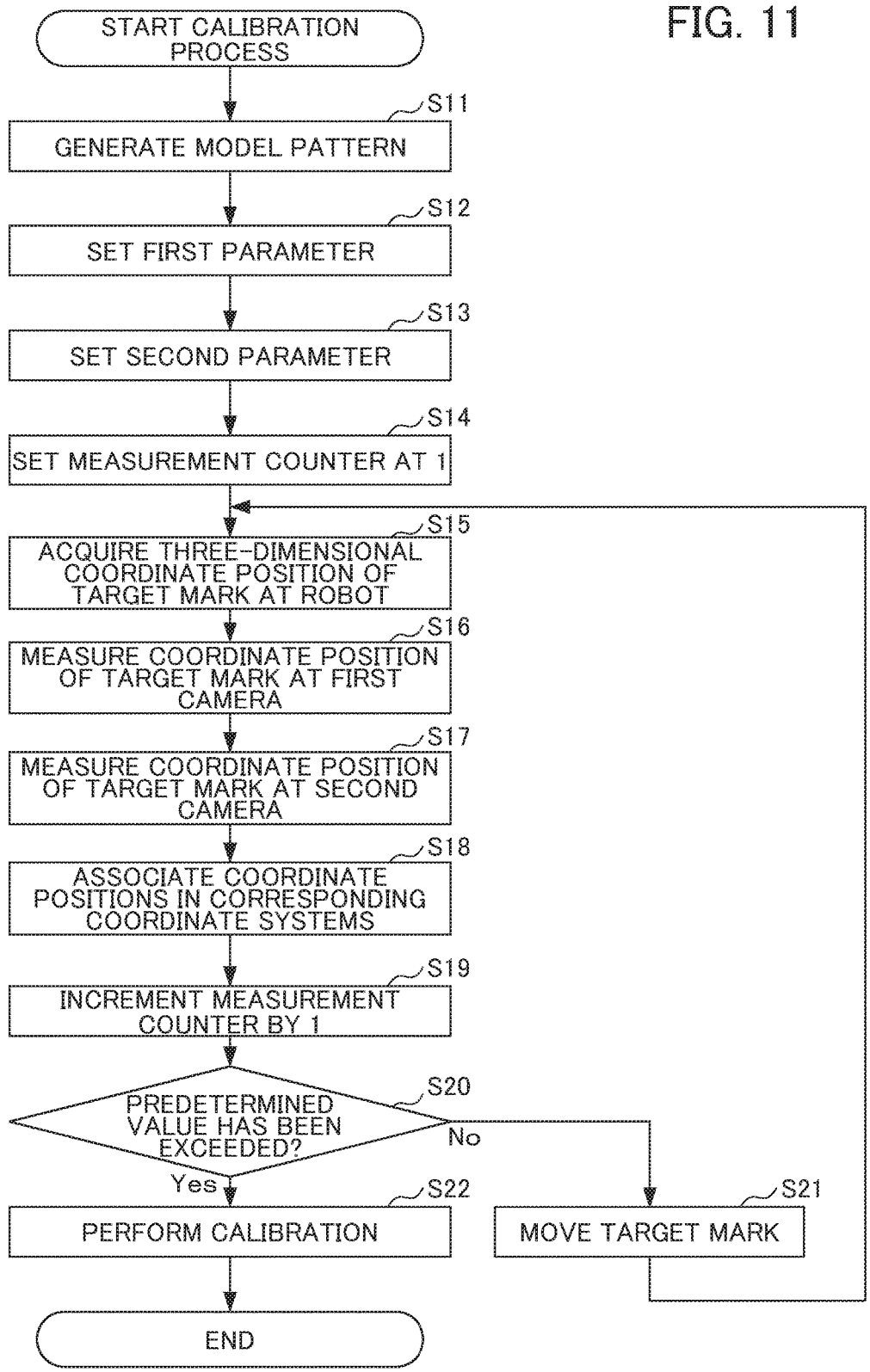
FIG. 11 is a flowchart showing process by the visual sensor controller 1 while the stereo camera 2 is calibrated.

FIG. 11 is a flowchart showing process by the visual sensor controller 1 (CPU 10) while the stereo camera 2 with the first camera 21 and the second camera 22 according to this embodiment is calibrated. The calibration range is set in advance.

In step S11, the CPU 10 (model pattern generation unit 101) generates a model pattern by using the first camera 21 in response to operation by an operator.

In step S12, the CPU 10 (first parameter setting unit 102) sets the first parameter for the first camera 21 in response to designation by the operator.

In step S13, the CPU 10 (second parameter setting unit 104) sets the second parameter for detecting the model pattern about the target mark 5 from data about an image captured by the second camera 22 based on the first parameter set by the first parameter setting unit 102.

In step S14, the CPU 10 (calibration unit 106) sets a measurement counter for counting the number of times measurement is made at 1.

In step S15, the CPU 10 (calibration unit 106) acquires the three-dimensional coordinate position of the target mark 5 in the robot coordinate system measured by the robot controller 3.

In step S16, the CPU 10 (first detection unit 103) detects the target mark 5 from data about an image captured by the first camera 21, and measures the coordinate position of the detected target mark 5 in the image coordinate system at the first camera 21.

In step S17, the CPU 10 (second detection unit 105) detects the target mark 5 from the data about the image captured by the second camera 22, and measures the coordinate position of the detected target mark 5 in the image coordinate system at the second camera 22.

In step S18, the CPU 10 (calibration unit 106) associates the three-dimensional coordinate position of the target mark 5 in the robot coordinate system, the coordinate position of the target mark 5 in the image coordinate system at the first camera 21, and the coordinate position of the target mark 5 in the image coordinate system at the second camera 22 while the target mark 5 is at a current position.

In step S19, the CPU 10 (calibration unit 106) increments the measurement counter for counting the number of times measurement is made by 1.

In step S20, if the measurement counter does not exceed a predetermined value (No), the flow goes to step S21. If the measurement counter exceeds the predetermined value (Yes), the flow goes to step S22.

In step S21, the robot controller 3 moves the target mark 5 attached to the end of the arm 41 of the robot 4 to a place in the calibration range set in advance where the target mark 5 can be measured from the first camera 21 or the second camera 22. Then, the flow goes to step S15.

In step S22, the CPU 10 (calibration unit 106) calibrates the first camera 21 and the second camera 22 based on the association stored in step S18 between the three-dimensional coordinate position of the target mark 5 in the robot coordinate system, the coordinate position of the target mark 5 in the image coordinate system at the first camera 21, and the coordinate position of the target mark 5 in the image coordinate system at the second camera 22.

This process flow is not restrictive but has been described as an example.

In this embodiment, the visual sensor controller 1 includes: the image capture control unit 100 that makes the first camera 21 and the second camera 22 capture images of the target mark 5 attached to the robot 4 and moved by the robot 4 at each of multiple destinations; the first parameter setting unit 102 that sets the first parameter for detecting a model pattern about the target mark 5 from data about the image captured by the first camera 21; and the second parameter setting unit 104 that sets the second parameter for detecting the model pattern about the target mark 5 from data about the image captured by the second camera 22 based on the first parameter set by the first parameter setting unit 102. Thus, for calibration on multiple cameras such as those of a stereo camera 2, only the first parameter is required to be set for the first camera 21, while the second parameter is set for the second camera 22 by the second parameter setting unit 104 based on the first parameter, for example. This eliminates the need to generate a model pattern and a parameter for detecting a target mark 5 for each of the multiple cameras, thereby increasing efficiency.

The target mark 5 is attached to the end of the arm 41 of the robot 4, and has a three-dimensional position and a three-dimensional posture determined in advance in the end point coordinate system at the robot 4. This allows detection of the target mark 5 of various types.

Each of the first parameter and the second parameter includes a single numerical value, an on/off value, or a parameter having a range. This allows detection of the target mark 5 of various types.

The second parameter initially set by the second parameter setting unit 104 is set so as to allow detection of the target mark 5 without fail from the image captured by the second camera 22 that is detectable from the data about the image captured by the first camera 21 by using the first parameter set by the first parameter setting unit 102. This allows detection of the target mark 5 of various types.

If the first parameter has a predetermined range, the second parameter setting unit 104 sets a range for the second parameter in such a manner that the range for the second parameter has a size determined by a deviation from a center value in the predetermined range for the first parameter with respect to a value of the second parameter as a center with which the target mark 5 has been detected successfully from the data about the image captured by the second camera 22. This makes it possible to perform process of detecting the target mark 5 attached to the robot 4 efficiently from the data about the image captured by the second camera 22.

Each of the first parameter and the second parameter includes parameters about a model pattern, a size, and deformation about the target mark 5. This makes it possible to perform the process of detecting the target mark 5 attached to the robot 4 efficiently from the data about the image captured by the second camera 22.

Each of the first parameter and the second parameter can be a parameter applied to the model pattern about the target mark 5. The first parameter and the second parameter can be parameters applied to the data about the image captured by the first camera 21 and to the data about the image captured by the second camera 22 respectively. This allows detection of the target mark 5 of various types.

The calibration method of this embodiment includes: an image capture control step of making the first camera 21 and the second camera 22 capture images of the target mark 5 attached to the robot 4 and moved by the robot 4 at each of multiple destinations; a first parameter setting step of setting the first parameter for detecting a model pattern about the target mark 5 from data about the image captured by the first camera 21; and a second parameter setting step of setting the second parameter for detecting the model pattern about the target mark 5 from data about the image captured by the second camera 22 based on the first parameter set by the first parameter setting step. Thus, the calibration method achieves effects comparable to those achieved by the visual sensor controller 1.

The program of this embodiment causes a computer to execute: an image capture control step of making the first camera 21 and the second camera 22 capture images of the target mark 5 attached to the robot 4 and moved by the robot 4 at each of multiple destinations; a first parameter setting step of setting the first parameter for detecting the target mark 5 from data about the image captured by the first camera 21; and a second parameter setting step of setting the second parameter for detecting the target mark 5 from data about the image captured by the second camera 22 based on the first parameter set by the first parameter setting step. Thus, the program achieves effects comparable to those achieved by the visual sensor controller 1.

The embodiment of the present invention has been described, but the present invention is not limited to the above-described embodiment. The effects described in this embodiment are merely a list of most preferred effects resulting from the present invention. Effects achieved by the present invention are not limited to those described in this embodiment. In this embodiment, the visual sensor controller 1 is applied as the calibration device. However, the calibration device is not limited to the visual sensor controller 1. The calibration device may be a controller including the visual sensor controller 1 and the robot controller 3 integrated with each other. Alternatively, the calibration device may cover information processing devices (computers) in general. For example, the calibration device may be a server, a PC, various types of controllers, etc.

The calibration method implemented by the visual sensor controller 1 is realized by software. To realize the calibration method by software, programs constituting the software are installed on a computer (visual sensor controller 1). These programs may be stored in a removable medium and then distributed to a user. Alternatively, these programs may be distributed by being downloaded onto a computer of the user through a network.

EXPLANATION OF REFERENCE NUMERALS

1000 Robot system
1 Visual sensor controller (calibration device)
10 CPU
100 Image capture control unit
101 Model pattern generation unit
102 First parameter setting unit
103 First detection unit
104 Second parameter setting unit
105 Second detection unit
106 Calibration unit
11 Bus
12 Frame memory
13 ROM
14 RAM
15 Nonvolatile RAM
151 Reference information storage
152 Detection result storage
16 Camera interface
17 Monitor interface
18 External equipment interface
19 Monitor
2 Stereo camera
21 First camera
22 Second camera
3 Robot controller 4 Robot
41 Arm
5 Target mark

What is claimed is:

1. A calibration device that associates at least one of position information in an image coordinate system at a first camera of a stereo camera and position information in an image coordinate system at a second camera of the stereo camera with position information in a robot coordinate system at a robot, the calibration device comprising:
a model pattern generation unit that generates a model pattern about a target mark attached to the robot;
a first parameter setting unit that sets a first parameter for detecting the target mark using the model pattern from data about an image captured by the first camera;
a second parameter setting unit that sets a second parameter for detecting the target mark using the model pattern from data about an image captured by the second camera based on the first parameter set by the first parameter setting unit;
an image capture control unit that makes the first camera and the second camera capture images of the target mark attached to the robot and moved by the robot at each of multiple destinations;
a first detection unit that detects the target mark by using a value of the first parameter from the data about the image captured by the first camera, and measures the coordinate position of the detected target mark in the image coordinate system at the first camera;
a second detection unit that detects the target mark by using a value of the second parameter from the data about the image captured by the second camera, and measures the coordinate position or the detected target mark in the image coordinate system at the second camera; and
a calibration unit that calibrates the first camera and the second camera based on the coordinate position of the target mark in the image coordinate system at the first camera measured by the first detection unit, the coordinate position of the target mark in the image coordinate system at the second camera measured by the second detection unit, and the coordinate position of the target mark in the robot coordinate system while the images of the target mark are captured by the first camera and the second camera.

2. The calibration device according to claim 1, wherein the target mark is attached to an end of an arm of the robot, and has a three-dimensional position and a three-dimensional posture determined in advance in an end point coordinate system at the robot.

3. The calibration device according to claim 1, wherein each of the first parameter and the second parameter includes a single numerical value, an on/off value, or a parameter having a range.

4. The calibration device according to claim 1, wherein the second parameter initially set by the second parameter setting unit is set so as to allow detection of the target mark without fail from the image captured by the second camera that is detectable from the data about the image captured by the first camera by using the first parameter set by the first parameter setting unit.

5. The calibration device according to claim 4, wherein, if the first parameter has a predetermined range, the second parameter setting unit determines a range for the second parameter in such a manner that the range for the second parameter has a size determined by a deviation from a center value of the first parameter with respect to a value of the second parameter as a center with which the target mark has been detected successfully from the data about the image captured by the second camera.

6. The calibration device according to claim 1, wherein each of the first parameter and the second parameter includes parameters about a model pattern, a size, and deformation about the target mark.

7. The calibration device according to claim 4, wherein each of the first parameter and the second parameter is a parameter applied to the model pattern about the target mark,
the first detection unit detects the target mark from the data about the image captured by the first camera by using the model pattern to which the first parameter is applied, and
the second detection unit detects the target mark from the data about the image captured by the second camera by using the model pattern to which the second parameter is applied.

8. The calibration device according to claim 1, wherein the first parameter and the second parameter are parameters applied to the data about the image captured by the first camera and to the data about the image captured by the second camera respectively,
the first detection unit detects the target mark from image data generated by applying the first parameter to the data about the image captured by the first camera, and
the second detection unit detects the target mark from image data generated by applying the second parameter to the data about the image captured by the second camera.

9. A calibration method implemented by a calibration device that associates position information in an image coordinate system at a first camera of a stereo camera, position information in an image coordinate system at a second camera of the stereo camera, and position information in a robot coordinate system at a robot,
the calibration method comprising the following steps executed by the calibration device:
a model pattern generation step of generating a model pattern about a target mark attached to the robot;
a first parameter setting step of setting a first parameter for detecting the target mark using the model pattern from data about an image captured by the first camera;
a second parameter setting step of setting a second parameter for detecting the target mark using the model pattern from data about an image captured by the second camera based on the first parameter set by the first parameter setting step;
an image capture control step of making the first camera and the second camera capture images of the target mark attached to the robot and moved by the robot at each of multiple destinations;
a first detection step of detecting the target mark by using a value of the first parameter from the data about the image captured by the first camera, and measuring the coordinate position of the detected target mark in the image coordinate system at the first camera;
a second detection step of detecting the target mark by using a value of the second parameter from the data about the image captured by the second camera, and measuring the coordinate position of the detected target mark in the image coordinate system at the second camera; and
a calibration step of calibrating the first camera and the second camera based on the coordinate position of the target mark in the image coordinate system at the first camera measured by the first detection step, the coordinate position of the target mark in the image coordinate system at the second camera measured by the second detection step, and the coordinate position of the target mark in the robot coordinate system while the images of the target mark are captured by the first camera and the second camera.

10. A non-transitory computer-readable medium encoded with a program for causing a computer to execute: a model pattern generation step of generating a model pattern about a target mark attached to a robot;
  a first parameter setting step of setting a first parameter for detecting the target mark using the model pattern from data about an image captured by the first camera;
  a second parameter getting step of setting a second parameter for detecting the target mark using the model pattern from data about an image captured by the second camera based on the first parameter set by the first parameter setting step;
  an image capture control step of making the first camera and the second camera capture images of the target mark attached to the robot and moved by the robot at each of multiple destinations;
  a first detection step of detecting the target mark by using a value of the first parameter from the data about the image captured by the first camera, and measuring the coordinate position of the detected target mark in an image coordinate system at the first camera by using a value of the first parameter;
  a second detection step of detecting the target mark by using a value of the second parameter from the data about the image captured by the second camera, and measuring the coordinate position of the detected target mark in the image coordinate system at the second camera; and
  a calibration step of calibrating the first camera and the second camera based on the coordinate position of the target mark in the image coordinate system at the first camera measured by the first detection step, the coordinate position of the target mark is the image coordinate system at the second camera measured by the second detection step, and the coordinate position of the target mark in a robot coordinate system while the images of the target mark are captured by the first camera and the second camera.

* * * * *